US012526335B2

(12) United States Patent
Hamrick, Jr.

(10) Patent No.: US 12,526,335 B2
(45) Date of Patent: Jan. 13, 2026

(54) NONSTOP VIRTUAL REMOTE DIRECT MEMORY ACCESS

(71) Applicant: Hewlett Packard Enterprise Development LP, Spring, TX (US)

(72) Inventor: James R. Hamrick, Jr., Murrieta, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/468,452

(22) Filed: Sep. 15, 2023

(65) Prior Publication Data

US 2025/0097293 A1 Mar. 20, 2025

(51) Int. Cl.
*H04L 67/1097* (2022.01)
*G06F 9/455* (2018.01)
*H04L 69/16* (2022.01)

(52) U.S. Cl.
CPC ...... *H04L 67/1097* (2013.01); *G06F 9/45558* (2013.01); *G06F 2009/45583* (2013.01); *H04L 69/161* (2013.01)

(58) Field of Classification Search
CPC ............... H04L 67/1097; H04L 69/161; G06F 9/45558; G06F 2009/45583
See application file for complete search history.

(56) References Cited

U.S. PATENT DOCUMENTS

| 6,909,717 | B1* | 6/2005 | Higgins | H04L 12/64 370/471 |
| 2004/0117368 | A1* | 6/2004 | Saha | H04L 49/90 |
| 2010/0183024 | A1* | 7/2010 | Gupta | H04L 1/1685 714/748 |
| 2017/0168986 | A1* | 6/2017 | Sajeepa | G06F 15/17331 |
| 2019/0044861 | A1* | 2/2019 | Wandler | H04L 47/12 |
| 2022/0398118 | A1 | 12/2022 | Akula et al. | |

OTHER PUBLICATIONS

F. D. Neeser et al., :SoftRDMA: Implementing iWARP over TCP kernel sockets, 2010. (Year: 2010).*
Zhou et al., "SR-DCQCN: Combining SACK and ECN for RDMA Congestion Control," 2022. (Year: 2022).*

(Continued)

*Primary Examiner* — Andrew C Georgandellis
(74) *Attorney, Agent, or Firm* — Yao Legal Services, Inc.

(57) ABSTRACT

A system and method can facilitate software-based remote direct memory access (RDMA) communications over transport control protocol (TCP). The system establishes, by an RDMA emulation software layer in a first virtual machine, a TCP connection with a second virtual machine. Responsive to establishing the TCP connection, the system identifies, by the RDMA emulation software layer in the first virtual machine based on socket information received from the second virtual machine, a TCP socket associated with the TCP connection. Responsive to the first virtual machine initiating an RDMA send operation, the system, by the RDMA emulation software layer in the first virtual machine: prepends an RDMA send frame with a protocol header associated with the RDMA emulation software layer; and transmits, via the TCP socket, the prepended RDMA send frame. The system performs the RDMA send operation over the TCP connection.

13 Claims, 9 Drawing Sheets

(56) References Cited

OTHER PUBLICATIONS

Kim et al., "FreeFlow: Software-based Virtual RDMA Networking for Containerized Clouds," 2019. (Year: 2019).*
"Software-based Roce, A New Way to Experience RDMA, " 2015. (Year: 2015).*
R. Recio et al., "An RDMA Protocol Specification," 2003. (Year: 2003).*
Hilland et al., "RDMA Protocol Verbs Specification," Apr. 2003. (Year: 2003).*
Recio et al., "A Remote Direct Memory Access Protocol Specification," Oct. 2007. (Year: 2007).*
HPE, "Accelerating the shift to digital payments—Red Link S.A. case study", 2021, 4 pages.
HPE, "Creating a Robust Environment to Process €800 Trillion in Financial Transactions", 2021, 3 Pages.
HPE, "Hardware Architecture Guide for HPE Virtualized Nonstop on VMWare", 2022, 37 Pages.
HPE, "Hpe Virtualized NonStop Software", Data sheet, 2023, 4 pages.
HPE, "Modernizing payment systems for the future of cashless payments—Sumitomo Mitsui Card case study", 2022, 5 pages.
HPE, "Virtualized NonStop hardware requirements", available online at <https://support.hpe.com/hpesc/public/docDisplay?docLocale=en_US&docId=a00057654en_us&page=GUID-84C2EF18-3BFE-4EEA-85CA-A5E4AEB2D818.html>, 2023, 2 pages.
Vimeo, "TBC20-053—A Peek into How Dell Technologies Runs Virtualized NonStop for Critical Applications", available online at <https://vimeo.com/showcase/7776942/video/477349482>, 2023, 3 pages.
InfiniBandTM Trade Association, "RDMA over Converged Ethernet (RoCE)", Supplement to InfiniBandTM Architecture Specification, vol. 1, Release 1.2.1, Annex A16, Apr. 6, 2010, 19 pages.
InfiniBandTM; "Supplement to InfiniBandTM Architecture Specification vol. 1 Release 1.2.1", Annex A17: RoCEv2, Sep. 2, 2014, 23 pages.
InfiniBandSM Trade Association, "InfiniBandTM Architecture Specification vol. 1", Release 1.2.1, pp. 1-1727.

* cited by examiner

NONSTOP VIRTUAL REMOTE DIRECT MEMORY ACCESS

BACKGROUND

Field

Some current computing systems can be deployed on private clouds, but may require specific remote direct memory access (RDMA)-capable hardware, such as an RDMA over Converged Ethernet (RoCE) network interface card (NIC). However, RoCE NICs may not be used in most cloud-based systems. Furthermore, some current systems may run over User Datagram Protocol (UDP) and support a small number of vendor-specific hypervisors. As a result, some current computing systems may be limited to the hardware-based design of RoCE NICs over UDP and a limited set of hypervisors.

BRIEF DESCRIPTION OF THE FIGURES

In the figures, like reference numerals refer to the same figure elements.

DETAILED DESCRIPTION

Aspects of the instant application provide a software layer which emulates RDMA protocols and facilitates RDMA communications over TCP. As described above, some current computing systems (e.g., Virtualized NonStop (vNS) systems) have been deployed on private clouds which may require specific RDMA-capable hardware components (e.g., an RDMA over Converged Ethernet (RoCE) NIC). RoCE NICs may not be supported by standard cloud offerings. In addition, some current computing systems run over UDP and support the use of a small number of vendor-specific hypervisors. Modifying a specific operating system (OS) (e.g., the NonStop OS) to run on other hypervisors may require a significant cost and time (in the order of years). In addition, some current computing systems may be restricted to using orchestration tools which are specific to a private cloud. Implementing cloud-native orchestration tools for other cloud environments may also require a significant cost and time (again in the order of years).

Aspects of the instant application provide a system and method which address the above-described limitations. The described aspects provide a software stack which can be deployed on both private and public clouds, i.e., performing RDMA operations over a TCP connection, without using a RoCE NIC and not limited to any specific hypervisor. The software stack can comprise a software layer (e.g., NonStop Virtual Remote Direct Memory Access (NVRDMA)) which emulates RDMA protocols over TCP, thus eliminating the RoCE NIC requirement. The RDMA emulation software layer can further allow for the use of any hypervisor using generic Ethernet NICs, thus eliminating the restriction to vendor-specific hypervisors. A detailed description of the RDMA emulation software layer in an architecture is provided below in relation to FIG. 1, while diagrams of establishing and closing a communication channel, as well as performing RDMA operations, are provided below in relation to FIGS. 2-6.

The terms "virtual RDMA (VRDMA)" and "virtual RDMA NIC (VRDMA NIC)" are used interchangeably in this disclosure and refer to an RDMA-emulation software layer. In the described aspects, the RDMA-emulation software layer can comprise a first software layer on a first virtual machine and a second software layer on a second virtual machine. A "NonStop VRDMA (NVRDMA)" is an example of a virtual RDMA.

The term "RDMA-enabled hardware component" can refer to a hardware or networking component which can provide RDMA communications, e.g., over UDP. An example of an RDMA-enabled hardware component is an RDMA over Converged Ethernet (RoCE) NIC.

The term "connection" refers to a communication channel which can be established between two computing entities, including virtual machines and physical machines. The connection or communication channel may be established between hardware components or software layers of the computing entities.

Environment for Facilitating Software-Based RDMA Communications Over TCP

Figure 1:
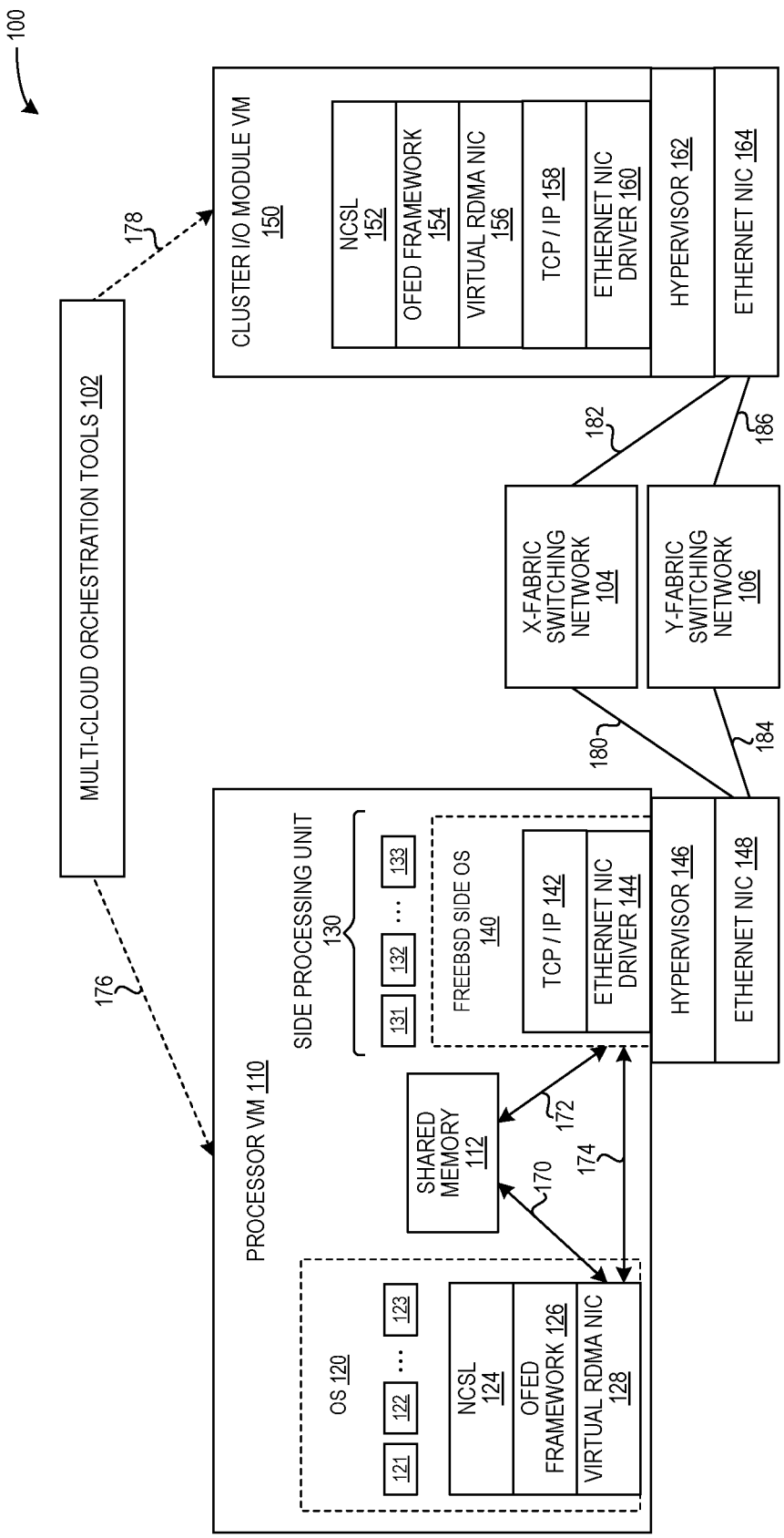
FIG. 1 illustrates an environment which includes a computing system with two virtual machines for facilitating software-based RDMA communications over transport control protocol (TCP), in accordance with an aspect of the present application.

FIG. 1 illustrates an environment 100 which includes a computing system with two virtual machines for facilitating software-based RDMA communications over TCP, in accordance with an aspect of the present application. Environment 100 can include two virtual machines (VMs): a processor VM 110; and a cluster input/output (I/O) module (CLIM) VM 150. Processor VM 110 can include: a first operating system (OS) 120 with dedicated cores (e.g., 121, 122, and 123); and a side processing unit (SPU) 130 with dedicated cores (e.g., 131, 132, and 133) including a second operating system, e.g., a FreeBSD Side OS 140. OS 120 can include layers such as: a library for handling connection services (e.g., a NonStop Connection Services Library (NCSL) 124); an Open Fabrics Enterprise Distribution (OFED) framework 126; and a virtual RDMA unit comprising a software layer (e.g., a Virtual RDMA NIC 128). FreeBSD 140 can include: a TCP/Internet Protocol (IP)

layer 142; and an Ethernet NIC driver 144 for communication with an Ethernet NIC 148 via a hypervisor 146. CLIM VM 150 can include: a library for handling connection services (e.g., an NCSL 152); an OFED framework 154; a virtual RDMA unit comprising a software layer (e.g., a Virtual RDMA NIC 156); a TCP/IP layer 158; and an Ethernet NIC driver 160 for communication with an Ethernet NIC 164 via a hypervisor 162.

OS 120 and FreeBSD Side OS 140 of SPU 130 can operate alongside one another within the confines of processor VM 110, using segregated resources (e.g., dedicated cores for each OS). OS 120 and FreeBSD Side OS 140 can communicate with each other using producer-consumer queues located in a shared memory interface 112 (via, e.g., communications 170 and 172). VRDMA NIC Event queues can be used by the OS 120 to send events/commands from the OS 120 kernel to SPU 130, and SPU Event Queues can be used by SPU 130 to send notifications and command responses from SPU 130 to the OS 120 kernel. OS 120 and FreeBSD Side OS 140 can also communicate using interprocessor interrupts (IPIs) 174 between the OS 120 cores (121-123) and the SPU cores (131-133). SPU cores (131-133) can provide an offloaded TCP layer for improved VRDMA NIC performance. IPIs 174 can be used to prod the consumers on both OS 120 and FreeBSD Side OS 140 to process queued events.

Processor VM 110 and CLIM VM 150 can communicate with each other through their respective Ethernet NICs 148 and 164 via one or more fabric switching networks (e.g., via an X-fabric switching network 104 through communications 180 and 182 or via a Y-fabric switching network 106 through communications 184 and 186). Networks 104 and 106 may be redundant fabrics, as the VRDMA software layer may require two Ethernet ports for each virtual machine in order to support fault tolerance. The ports can be provided by either a single dual-ported Ethernet NIC or by two single-ported Ethernet NICs. Providing the link-alive status of the Ethernet port to the VRDMA software layer can allow the VRDMA software layer to manifest that link-alive status as the VRDMA NIC port status.

While not depicted in FIG. 1, environment 100 can include other components related to processor VM 110, for example, a boot loader to bring up both OS 120 and FreeBSD Side OS 140 of SPU 130. FreeBSD Side OS 140 can boot up first, and OS 120 can boot up second. Environment 100 can also include coordinated error handling and recovery logic to respond to panic events which may be encountered by either OS. Environment 100 can also include tools to collect and analyze consolidated core dumps which contain state from both operating systems (OSes) as well as supportability features (e.g., event logging and performance monitoring) of both OSes. Furthermore, environment 100 can include support to supply key-value pair initialization parameters to processor VM 110 across multiple hypervisors. CLIM VM 150 does not require a side OS because it can run a specific Linux OS.

In addition, multi-cloud orchestration tools 102 can be used to deploy and manage the two virtual machines (processor VM 110 and CLIM VM 150). Tools 102 can be generalized to interface with many multi-cloud orchestrator frameworks widely available in hyperscalers, which can eliminate the requirement of writing tools natively for multiple cloud providers.

In some aspects, processor VM 110 can comprise a NonStop processor VM, OS 120 can comprise a NonStop OS, CLIM VM 150 can comprise a NonStop CLIM VM, and virtual RDMA NICs 128/156 can comprise an RDMA software emulation layer or a NonStop Virtual RDMA (NVRDMA) NIC.

Establishing a Communication Channel Using Software-Based RDMA over TCP

Figure 2:
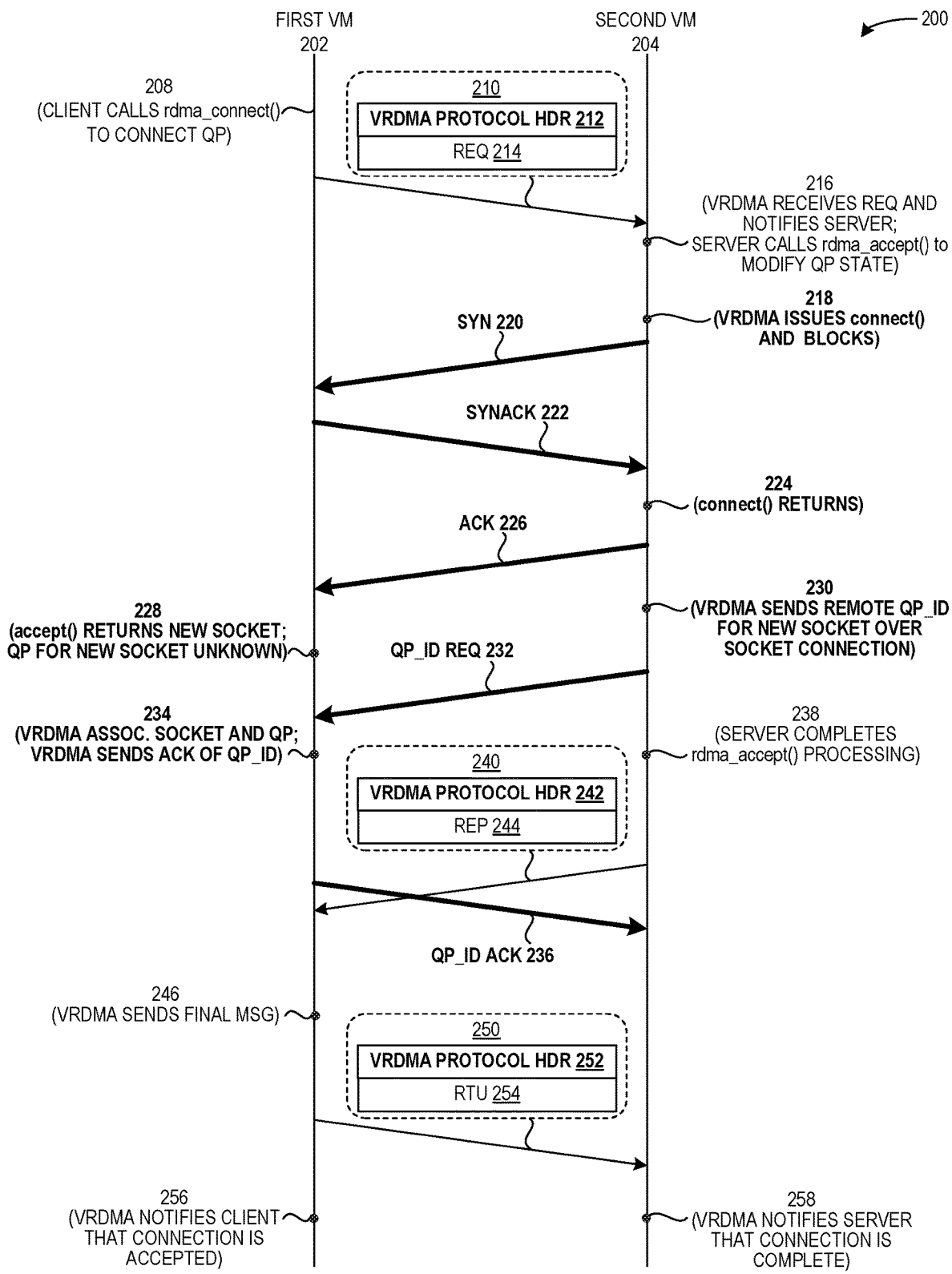
FIG. 2 presents a diagram illustrating a communication flow between two virtual machines with an RDMA emulation software layer, for creating a communication channel, in accordance with an aspect of the present application.

FIG. 2 presents a diagram 200 illustrating a communication flow between two virtual machines (a first VM 202 and a second VM 204) with an RDMA emulation software layer, for creating a communication channel, in accordance with an aspect of the present application. In some aspects, the terms "client" and "server" are used to describe an initiator of and a responder to a particular sequence of operations. For example, in diagram 200, first VM 202 may be considered the client while second VM 204 may be considered the server. While the communications in FIGS. 2-6 are depicted as being initiated by first VM 202 (with first VM 202 as the client and second VM 204 as the server), the communications may occur in reverse (i.e., with second VM 204 as the client and first VM 202 as the server). In addition, the first and second virtual machines may reside on the same or different computing systems or entities.

In FIGS. 2-6, bold lines and text can indicate communications between the Virtual RDMA software layers of the two virtual machines. Non-bold lines and text can indicate communications over RDMA-enabled hardware components (e.g., communications which are tunneled through the UDP protocol using RoCE wire-level protocol). These same communications in non-bold lines can also occur when Virtual RDMA is being used, rather than RDMA-enabled hardware components. Hence, the communications in bold text correspond to the described aspects of this application. Furthermore, in FIGS. 3-6, respectively, virtual machines 302/304, 402/404, 502/504, and 602/604 can depict non-limiting examples of virtual machines 202/204 in FIG. 2.

As part of establishing a communication channel, hardware components may communicate using, e.g., InfiniBand (IB) connection management (CM) messages over unreliable datagram (UD) queue pairs (QPs), as depicted by the three IB CM messages in diagram 200: a request (REQ) message 214; a reply (REP) message 244; and an RTU message 254.

In the described aspects, to establish a communication channel between QPs using the RDMA emulation software layer, the same three IB CM messages are sent (shown in non-bold), but additional VRDMA layer messages (shown in bold) are also sent and weaved in between the wire-level protocols. Instead of using the hardware wire-level protocols (e.g., via a RoCE NIC), the VRDMA layer can use its own wire-level protocol which operates over, e.g., UDP port 18402. In addition to sending messages of the UD QPs, the VRDMA layer can also establish a TCP connection between the QPs. The software layers above the VRDMA layer can remain unaware of this TCP connection. The VRDMA layers can establish the TCP connection using a standard three-way handshake as well as two additional protocol messages (all shown in bold).

During operation, VRDMA on first VM 202 can listen on TCP port 18402 and start a thread to block performing an accept( ) while a server on second VM 204 can call rdma_listen( ) to listen for an incoming connection request (not shown). A client on first VM 202 can call rdma_connect( ) to connect the QPs (operation 208), which results in sending REQ 214 message. REQ 214 can include the local QP ID to be used for subsequent communications and can be sent prepended with a VRDMA protocol header 212 as a frame 210. VRDMA of second VM 204 can receive REQ 214 and notify the server, which can call rdma_accept( ) to accept the connection (operation 216). As a result of calling rdma_accept( ) second VM 204 can modify the state of the QP (operation 216), e.g., by using the modify_qp( ) verb to move the QP to a "ready-to-receive" state. VRDMA on second VM 204 can issue a connect( ) and block (operation 218) to establish a TCP connection with first VM 202 via the standard three-way handshake: VRDMA of second VM 204 can transmit a SYN 220 message to VRDMA of first VM 202; VRDMA of first VM 202 can subsequently transmit a SYNACK 222 message to VRDMA of second VM 204; and VRDMA of second VM 204 can send an ACK 226 message back to VRDMA of first VM 202.

Upon receiving ACK 226, VRDMA of first VM 202 can determine that the previously called accept( ) returns a socket (i.e., VRDMA of first VM 202 can identify the stream socket associated with the TCP connection), but the QP with which to associate the socket is not known (operation 228). Upon VRDMA of second VM 204 receiving SYNACK 222, the previously called connect( ) can return (operation 224). In addition, VRDMA of second VM 204 can transmit a first protocol message, by sending the remote QP ID for the new TCP socket over the TCP socket (operation 230 which sends a QP_ID Request (REQ) 232). Upon receiving the QP_ID information (of QP_ID REQ 232), VRDMA of first VM 202 can associate the socket with the identifier for the QP (operation 234) and can also transmit a second protocol message, by sending an acknowledgment (QP_ID ACK 236) of the received QP_ID information (232). The two protocol messages allow the software layers (i.e., VRDMAs of both virtual machines 202 and 204) to associate the stream sockets on each side of the connection with their associated QPs.

Second VM 204 can complete the processing of the rdma_accept ( ) (operation 238), which was previously started in operation 216, and transmit the REP 244 message, which can be sent prepended with a VRDMA protocol header 242 as a frame 240. In response to the REP 244 message, VRDMA of first VM 202 can send its final message (operation 246) as RTU message 254, which can be sent prepended with a VRDMA protocol header 252 as a frame 250. Finally, VRDMA of first VM 202 can notify first VM 202 that the connection is accepted (operation 256) and VRDMA of second VM 204 can notify second VM 204 that the connection is complete (operation 258).

In diagram 200, communications 240 and 236 are depicted as crossing because they are not dependent upon each other. While communications 232 and 236 occur in sequence after the three-way handshake communications 220, 222, and 226 of establishing the TCP connection, communications 240 and 250 may occur either prior or subsequent to communications 232 and 236.

Performing RDMA Operations Using Software-Based RDMA Over TCP

Figure 3:
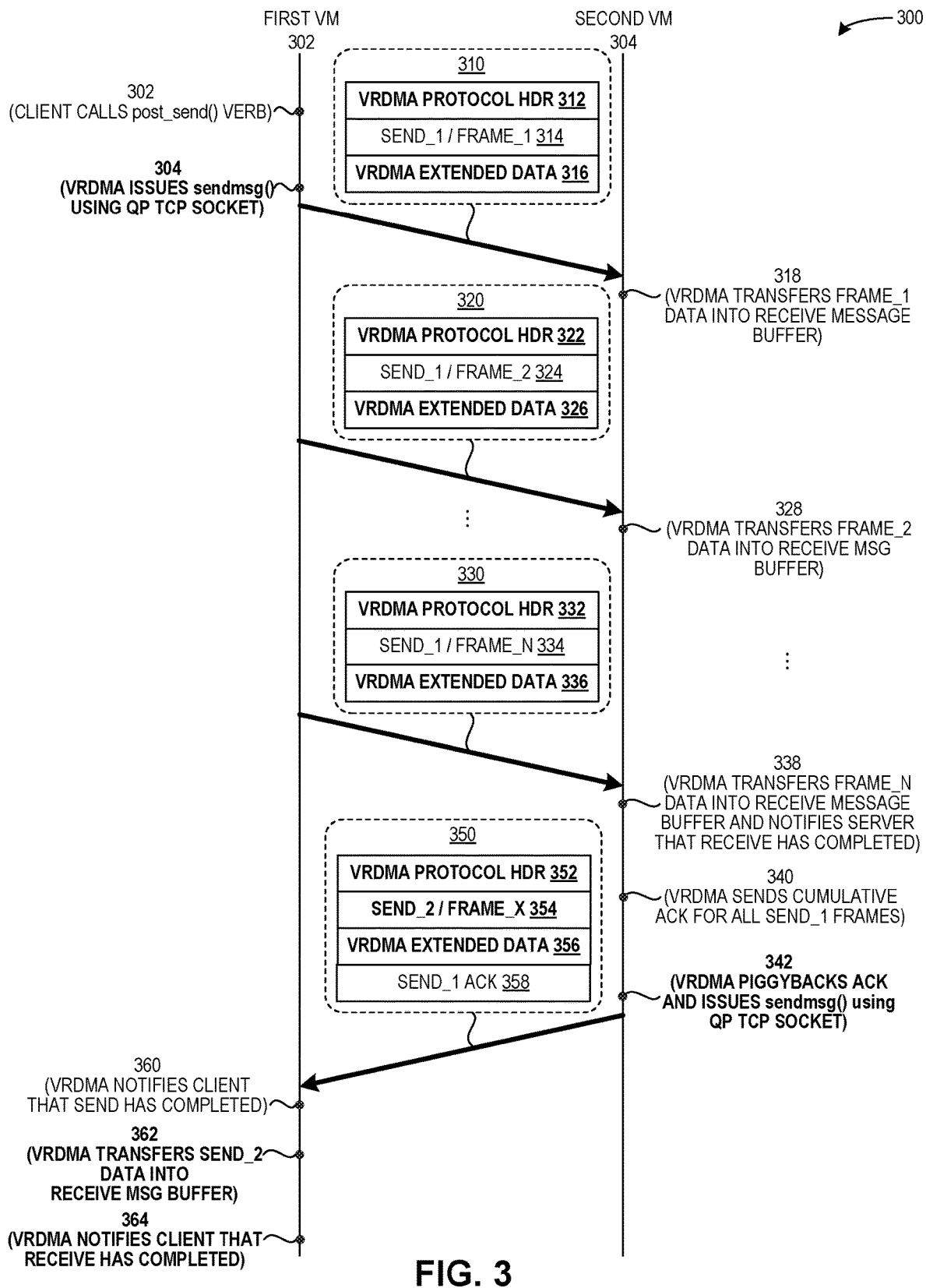
FIG. 3 presents a diagram illustrating a communication flow between two virtual machines with an RDMA emulation software layer, for performing an RDMA Send operation, in accordance with an aspect of the present application.

FIG. 3 presents a diagram 300 illustrating a communication flow between two virtual machines (302 and 304) with an RDMA emulation software layer, for performing an RDMA Send operation, in accordance with an aspect of the present application.

When using RDMA-enabled NICs (i.e., RoCE NICs) to perform an IB Send operation, the client can call the post_send( ) verb, which formats a Work Queue Element (WQE) describing the Send operation and generally writes directly to the RoCE NIC hardware to trigger the RoCE NIC to process the WQE. The hardware can transfer data related to the Send operation across an Ethernet network using IB Send frames tunneled over UDP, as part of the RoCE wire-level protocol. The RoCE wire-level protocol can provide an option to cumulatively acknowledge an entire sequence of Send frames with a single ACK frame (as shown in FIG. 3 and described below). Transferring the data from the Send frames into a receive message buffer can be performed completely in hardware.

When using VRDMA over TCP as the underlying data transfer protocol, VRDMA can use a much larger frame size (e.g., as a byte stream) than when transferring data using RoCE over UDP. As a result, though multiple frames may be used, VRDMA may not need multiple frames to transfer Send data. Furthermore, transferring the data from the Send frames into the receive message buffer can be performed in software by VRDMA. The emulated wire-level protocol of VRDMA can allow the software layer to piggyback, onto the ACK for a client Send, a server Send. That is, the RDMA emulation software on VMs 302 and 304 can allow piggy-backing of additional information onto messages which are already passing back and forth between VMs 302 and 304, thus resulting in more efficient communications and performance, i.e., a performance optimization. In contrast, the RoCE wire-level protocol does not allow this performance optimization.

During operation, a client on first VM 302 can call the post_send( ) verb (operation 302), and in response, VRDMA on first VM 302 can issue a sendmsg( ) using the QP stream socket (operation 304), which was previously identified and described in FIG. 2. VRDMA of first VM 302 can prepend an RDMA send frame (send_1/frame_1 314) with a first VRDMA protocol header 312 and can optionally append the RDMA send frame with VRDMA extended data 316. First VRDMA protocol header 312 can be associated with the RDMA emulation software layer, and VRDMA extended data 316 can include additional data used for optimization in subsequent communications. The prepended (and optionally appended) RDMA send frame (e.g., a byte stream or a "wrapped" frame 310) can be transmitted via the stream socket to second VM 304. Second VM 304 can receive wrapped frame 310 (i.e., into a socket buffer by the underlying Ethernet hardware) and VRDMA of second VM 304 can transfer data associated with send_1/frame_1 314 (i.e., from the socket buffer) into a receive message buffer associated with second VM 304 (operation 318). First VM 302 can transmit additional RDMA send frames which are also prepended and optionally appended, e.g.: VRDMA of first VM 302 can prepend an RDMA send frame (send_1/frame_2 324) with a VRDMA protocol header 322 and can optionally append RDMA send frame 324 with VRDMA extended data 326; and VRDMA of first VM 302 can prepend an RDMA send frame (send_1/frame_N 334) with a VRDMA protocol header 332 and can optionally append RDMA send frame 334 with VRDMA extended data 336. These additional prepended and optionally appended RDMA send frames can be transmitted as byte streams or "wrapped" frames 320 and 330 and received by second VM 304, and the associated data can be transferred by VRDMA of second VM 304 into the receive message buffer associated with second VM 304 (e.g., operations 328 and 338).

Second VM 304 can send a cumulative acknowledgment (send_1 ACK 358) of all the send_1 frames (e.g., frames 314, 324, and 334) (operation 340). VRDMA of second VM 304 can piggyback or add to cumulative acknowledgment 358 (operation 342) by prepending a second VRDMA protocol header 352, a send_2/frame_X 354, and VRDMA extended data 356. Second VRDMA protocol header 352 can indicate a size of frame 354, extended data 356, and cumulative acknowledgment 358. In some aspects, extended data may not be included, in which case second VRDMA protocol header 352 can indicate a size of frame 354 and cumulative acknowledgment 358. In other aspects, second VM 304 may not transmit a send frame 354, in which case VRDMA of VM 304 can send cumulative acknowledgment 358 on its own, with the prepended second protocol header 352 (indicating a size of cumulative acknowledgment 358).

VRDMA of second VM 304 can issue a sendmsg( ) using the QP stream socket (operation 342), and the prepended cumulative acknowledgment 358 (e.g., a byte stream or a "wrapped" frame 350) can be transmitted via the TCP socket to first VM 302. Upon receiving cumulative acknowledgment 358, VRDMA of first VM 302 can notify first VM 302 that the send has completed (operation 360). In addition, in the case that send_2/frame_X 354 is included in wrapped frame 350, VRDMA of first VM 302 can transfer the data associated with send frame 354 into a receive message buffer associated with first VM 302 (operation 362) and can also notify first VM 302 that the receive has completed (operation 364).

Figure 4:
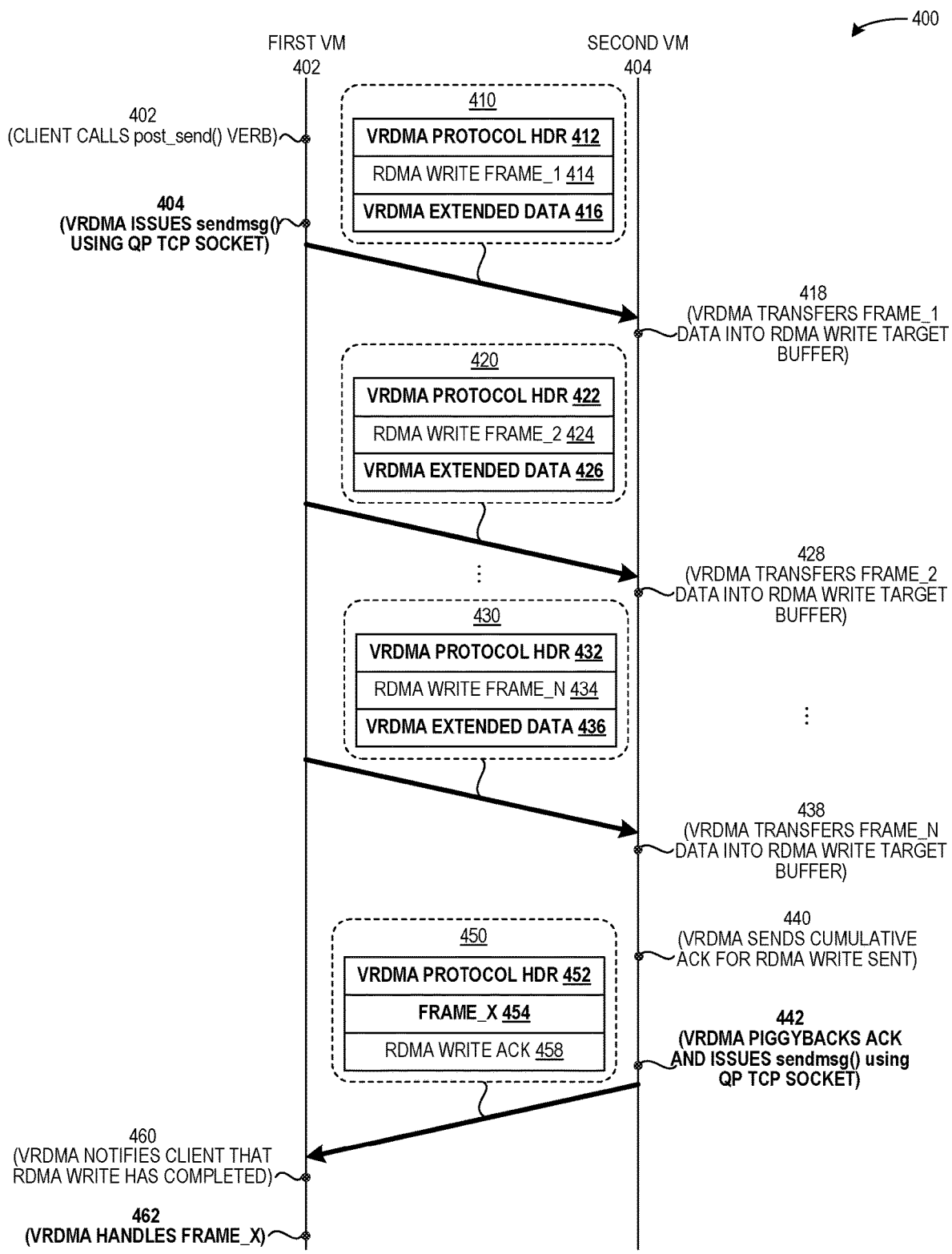
FIG. 4 presents a diagram illustrating a communication flow between two virtual machines with an RDMA emulation software layer, for performing an RDMA Write operation, in accordance with an aspect of the present application.

FIG. 4 presents a diagram 400 illustrating a communication flow between two virtual machines (402 and 404) with an RDMA emulation software layer, for performing an RDMA Write operation, in accordance with an aspect of the present application. Diagram 400 can be similar to diagram 300, where one difference is that the destination location of the data in the send frame of diagram 300 is not known or defined by the sender, while the destination location of the data in the RDMA Write frame of diagram 400 is identified by the sender.

During operation, a client on first VM 402 can call the post_send( ) verb (operation 402), and in response, VRDMA on first VM 402 can issue a sendmsg( ) using the QP TCP socket (operation 404), which was previously identified and described in FIG. 2. VRDMA of first VM 402 can prepend an RDMA Write frame (RDMA Write frame_1 414) with a second VRDMA protocol header 412 and can optionally append RDMA Write frame_1 414 with VRDMA extended data 416. Second VRDMA protocol header 412 can be associated with the RDMA emulation software layer, and VRDMA extended data 416 can include additional data used for optimization in subsequent communications. The prepended (and optionally appended) RDMA Write frame (e.g., a byte stream or a "wrapped" frame 410) can be transmitted via the TCP socket to second VM 404. Second VM 404 can receive wrapped frame 410 and transfer data associated with RDMA Write frame_1 414 into an RDMA Write target buffer associated with second VM 404 (operation 418). First VM 402 can transmit additional RDMA Write frames which are also prepended and optionally appended, e.g.: VRDMA of first VM 402 can prepend an RDMA Write frame_2 424 with a VRDMA protocol header 422 and can optionally append RDMA Write frame_2 424 with VRDMA extended data 426; and VRDMA of first VM 402 can prepend an RDMA Write frame_N 434 with a VRDMA protocol header 432 and can optionally append RDMA Write frame_N 434 with VRDMA extended data 436. These additional prepended and optionally appended RDMA Write frames can be transmitted as byte streams or "wrapped" frames 420 and 430 and received by second VM 404, and the associated data can be transferred by VRDMA of second VM 404 into the RDMA Write target buffer associated with second VM 404 (e.g., operations 428 and 438).

Second VM 404 can send a cumulative acknowledgment (RDMA Write ACK 458) of all the RDMA Write frames (e.g., frames 414, 424, and 434) (operation 440). VRDMA of second VM 404 can piggyback or add to cumulative acknowledgment 458 (operation 442) by prepending a third VRDMA protocol header 452. VRDMA of second VM 404 can also prepend another frame (e.g., a frame_X 454) to RDMA Write ACK 458 and can also prepend VRDMA extended data (not shown). Third VRDMA protocol header 452 can indicate a size of frame_X 454 (if prepended), extended data (if prepended), and RDMA Write ACK 458. As with the communications of diagram 300 depicted in FIG. 3, second VM 404 may not transmit a frame_X 454, in which case VRDMA of VM 404 can send cumulative acknowledgment 458 on its own, with the prepended third protocol header 452 (indicating a size of cumulative acknowledgment 458).

The prepended cumulative acknowledgment 458 (e.g., a byte stream or a "wrapped" frame 450) can be transmitted via the TCP socket to first VM 402. Upon receiving cumulative acknowledgment 458, VRDMA of first VM 402 can notify first VM 402 that the RDMA Write has completed (operation 460). In addition, in the case that frame_X 454 is included in wrapped frame 450, VRDMA of first VM 402 can handle frame_X 454 (which can correspond to any RDMA operation) (operation 462).

Figure 5:
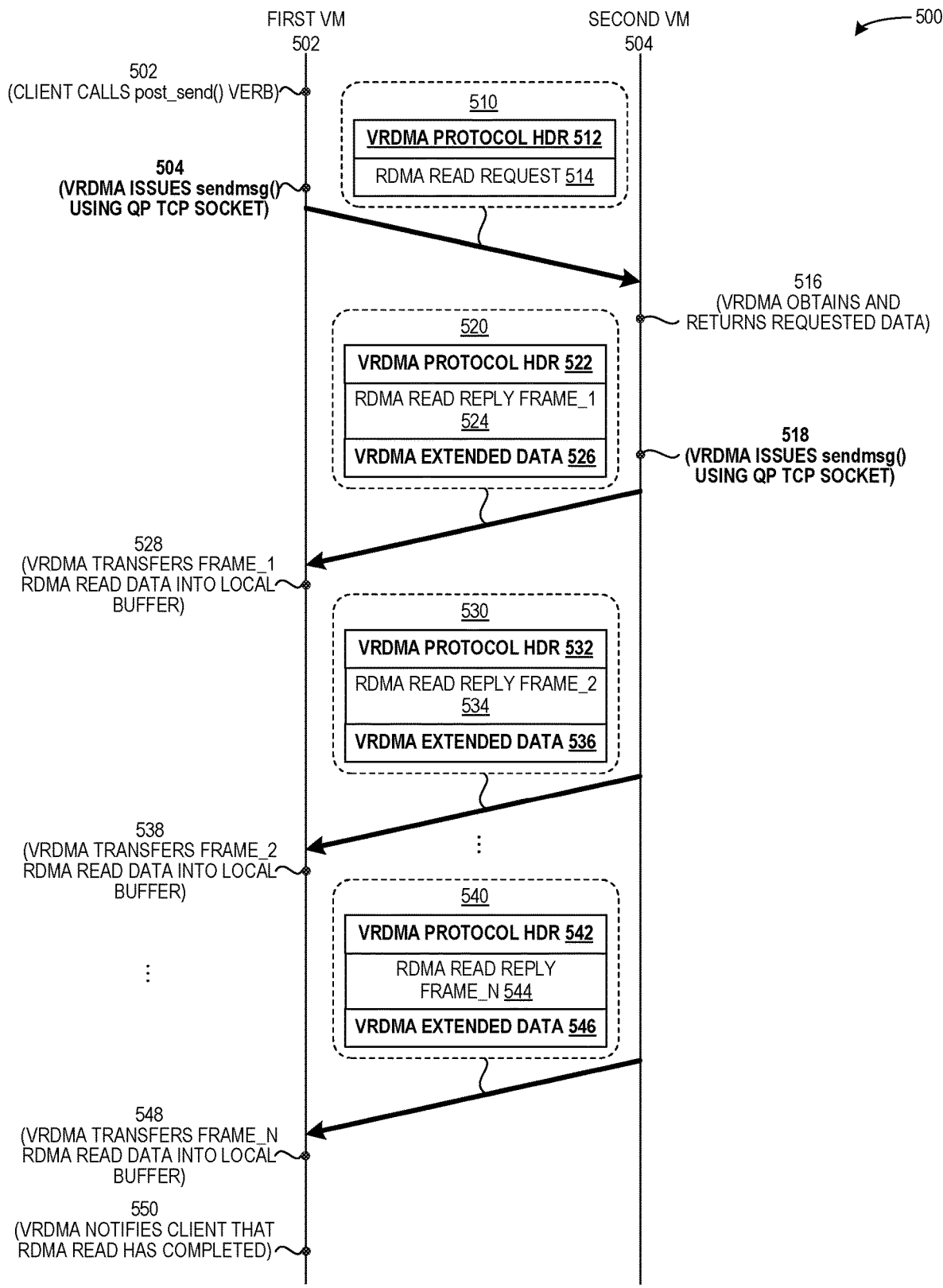
FIG. 5 presents a diagram illustrating a communication flow between two virtual machines with an RDMA emulation software layer, for performing an RDMA Read operation, in accordance with an aspect of the present application.

FIG. 5 presents a diagram 500 illustrating a communication flow between two virtual machines (502 and 504), with an RDMA emulation software layer, for performing an RDMA Read operation, in accordance with an aspect of the present application. Diagram 500 can be similar to diagrams 300 and 400, but includes some communications in a reverse direction based on the depiction of first VM 502 as the initiating entity.

As described above, when using RDMA-enabled NICs (i.e., RoCE NICs) to perform an IB RDMA Read operation, the client can call the post_send( ) verb, which formats a Work Queue Element (WQE) describing the RDMA Read operation and generally writes directly to the RoCE NIC hardware to trigger the RoCE NIC to process the WQE. The hardware of the client can send the RDMA Read request to the hardware of the server, and the server can return the requested data using IB RDMA Read reply frames tunneled over UDP, as part of the RoCE wire-level protocol. Similar to the Send and the RDMA Write operations described above, the RoCE wire-level protocol can provide an option to cumulatively acknowledge an entire sequence of Send frames with a single ACK frame. Transferring the data from the RDMA Read reply frames into a local buffer on the client can be performed completely in hardware.

When using VRDMA over TCP (instead of using RoCE over UDP) as the underlying data transfer protocol, VRDMA can use a much larger frame size. Thus, although multiple frames may be used, VRDMA may not need multiple frames to transfer RDMA Read reply data (as shown in FIG. 5 and described below). Furthermore, transferring the data from the RDMA Read reply frames into the local buffer can be performed in software by VRDMA. The RDMA emulation software on VMs 502 and 504 can allow piggybacking of additional information onto messages which are already passing back and forth between VMs 502 and 504 (such as RDMA Read reply frames). As described above, this performance optimization cannot be achieved using the RoCE wire-level protocol.

During operation, a client on first VM 502 can call the post_send( ) verb (operation 502), and in response, VRDMA on first VM 502 can issue a sendmsg( ) using the QP TCP socket (operation 504), which was previously identified and described in FIG. 2. VRDMA of first VM 502 can prepend an RDMA Read request frame (RDMA Read request 514) with a second VRDMA protocol header 512. Second VRDMA protocol header 512 can be associated with the RDMA emulation software layer and can indicate a size of RDMA Read request 514. The prepended RDMA Read request (e.g., a byte stream or a "wrapped" frame 510) can be transmitted via the TCP socket to second VM 504. Second VM 504 can obtain and return the requested read data (operation 516). VRDMA of second VM 504 can issue a sendmsg( ) using the QP TCP socket (operation 518), and can prepend an RDMA read reply frame (RDMA Read reply frame_524) with a third VRDMA protocol header 522 and can optionally append the RDMA Read reply frame with VRDMA extended data 526. The prepended (and optionally appended) RDMA Read reply frame (e.g., a byte stream or a "wrapped" frame 520) can be transmitted via the TCP socket to first VM 502. Upon receiving RDMA Read reply frame_1 524, first VM 502 can transfer the data associated with RDMA Read reply frame_1 524 into a local buffer associated with first VM 502 (operation 528).

Second VM 504 can transmit additional RDMA Read reply frames which are also prepended and optionally appended, e.g.: VRDMA of second VM 504 can prepend an RDMA Read reply frame_2 534 with a VRDMA protocol header 532 and can optionally append RDMA Read reply frame_2 534 with VRDMA extended data 536; and VRDMA of second VM 504 can prepend an RDMA Read reply frame_N 544 with a VRDMA protocol header 542 and can optionally append RDMA Read reply frame_N 544 with VRDMA extended data 546. These additional prepended and optionally appended RDMA Read reply frames can be transmitted as byte streams or "wrapped" frames 530 and 540 and received by first VM 502, and the associated data can be transferred by VRDMA of first VM 502 into the local buffer associated with first VM 502 (e.g., operations 538 and 548). Upon receiving RDMA Read reply frames 524, 534, and 544, VRDMA of first VM 502 can notify first VM 502 that the RDMA Read has completed (operation 550).

Closing a Communication Channel Using Software-Based RDMA Over TCP

Figure 6:
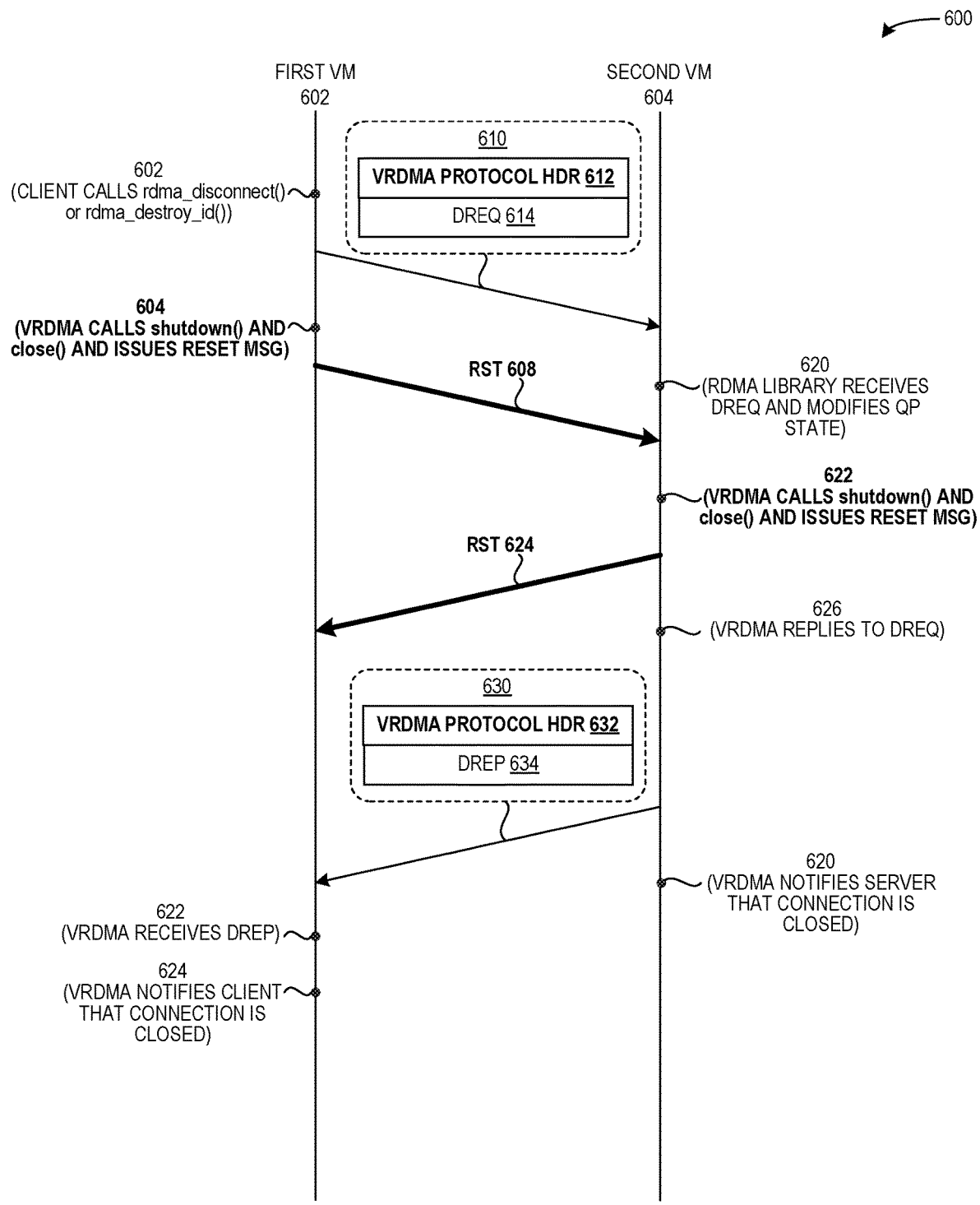
FIG. 6 presents a diagram illustrating a communication flow between two virtual machines with an RDMA emulation software layer, for closing a communication channel, in accordance with an aspect of the present application.

FIG. 6 presents a diagram 600 illustrating a communication flow between two virtual machines (602 and 604), with an RDMA emulation software layer, for closing a communication channel, in accordance with an aspect of the present application.

When releasing a connection between reliable connected (RC) QPs using RoCE NICs, the hardware can exchange a pair of IB CM messages (e.g., a disconnect request (DREQ) 614 message and a disconnect response (DREP) 634 message) over the UD QPs, which messages can be tunneled over UDP, as part of the RoCE wire-level protocol.

When releasing a connection between RC QPs using VRDMA over TCP VRDMA can transmit the same pair of messages, but the VRDMA software layer can use its own protocol operating over UDP port 18402. Thus, in addition to the messages sent over the UD QPs, the VRDMA software layer can exchange a pair of TCP reset segments, which can abruptly release or close the TCP connection. The VRDMA software layer can release the TCP connection between the QPs, and the software layers above the VRDMA level can remain unaware of the released TCP connection.

During operation, a client on first VM 602 can call the rdma_disconnect( ) or rdma_destroy_id( ) verbs (operation 602) and issue DREQ 614, which can be sent prepended with a VRDMA protocol header 612 as a frame 610. In response to operation 602, VRDMA on first VM 602 can set the socket linger to a value of "0," call shutdown( ) and close( ) and issue a first reset (RST) 608 message (operation 604). In addition, in response to operation 602, second VM 604 (e.g., an RDMA library) can receive DREQ 614 and modify the state of the QP (operation 620), e.g., by using the modify_qp( ) verb to move the QP to an "error" state.

In response to operation 620, VRDMA on second VM 604 can set socket linger to a value of "0," call shutdown( ) and close( ) and issue a second reset (RST) 624 message (operation 622). In addition, in response to operation 620, VRDMA of second VM 604 can reply to DREQ 614 (operation 626) by sending DREP 634, which can be sent prepended with a VRDMA protocol header 632 as a frame 630. First VM 602 can receive DREP 634 (operation 622), and VRDMA associated with first VM 602 can notify first VM 602 that the connection is closed (operation 624). In addition, VRDMA associated with second VM 604 can notify second VM 604 that the connection is closed (operation 620).

Examples of Improvements

The described aspects, including the RDMA emulation software layer, can transmit protocol packets over a byte stream and implement performance optimizations, such as minimizing memory copies and avoiding penalties incurred in Soft-RoCE arising from attempting to create reliable communication over UDP. The described aspects can also utilize additional cores to mitigate the added overhead of emulating RDMA using TCP/IP and Ethernet. Furthermore, the described aspects can use a low-latency shared-memory interface between the first OS of the processor VM and the offloaded TCP/IP stack. Additionally, aspects of the instant application can retain the ability to leverage RDMA protocols implemented in hardware if the system is deployed on servers with RoCE adapters.

The described aspects can also include multi-cloud orchestration tools (e.g., tools 102 depicted and described above in relation to FIG. 1). In addition to eliminating the requirement of writing tools natively for multiple cloud providers, the multi-cloud orchestration tools can enforce anti-affinity rules for VMs and storage to achieve fault-tolerant system deployments, e.g., by deploying a plurality of processor VMs and paired CLIM VMs in distinct servers, or by deploying virtual drive pairs on distinct storage pools to leverage storage mirroring features implemented by the first OS of the processor VM. The multi-cloud orchestration tools may also support deployment based on a single root input/output virtualization (SR-IOV); a peripheral component interconnect (PCI) pass-through; and a fully virtualized system fabric interface. Other improvements may exist in addition to the improvement described herein.

Method for Facilitating Software-Based RDMA Communications Over TCP

Figure 7A:
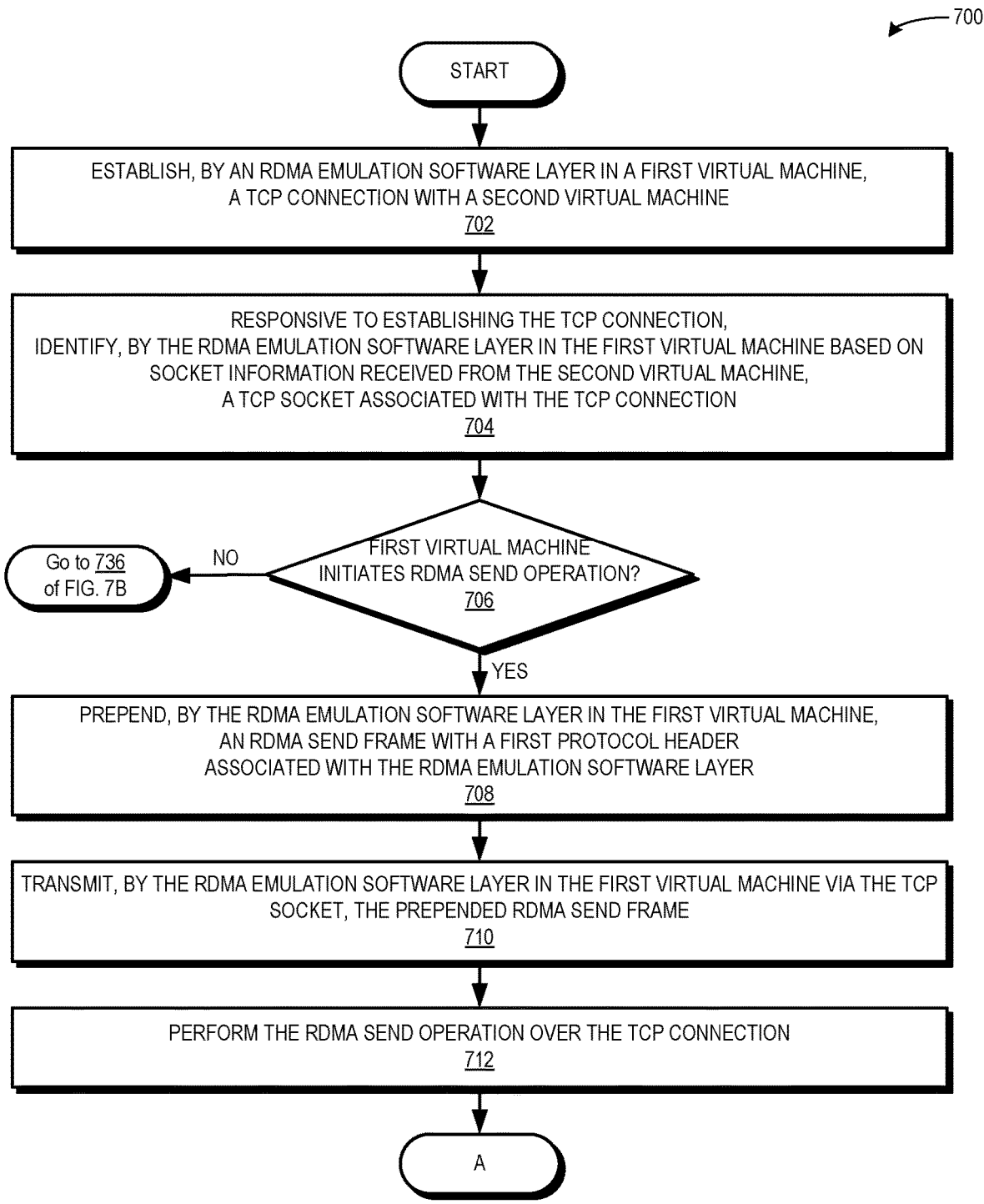
FIG. 7A presents a flowchart illustrating a method which facilitates software-based RDMA communications over TCP, in accordance with an aspect of the present application.

FIG. 7A presents a flowchart 700 illustrating a method which facilitates software-based RDMA communications over TCP, in accordance with an aspect of the present application. During operation, a system establishes, by a remote direct memory access (RDMA) emulation software layer in a first virtual machine, a transport control protocol (TCP) connection with a second virtual machine (operation 702). Responsive to establishing the TCP connection, the system identifies, by the RDMA emulation software layer in the first virtual machine based on socket information received from the second virtual machine, a TCP socket associated with the TCP connection (operation 704). If the first virtual machine does not initiate an RDMA send operation (decision 706), the operation continues at operation 736 of FIG. 7B.

If the first virtual machine initiates an RDMA send operation (decision 706), the system prepends, by the RDMA emulation software layer in the first virtual machine, an RDMA send frame with a first protocol header associated with the RDMA emulation software layer (operation 708). The system transmits, by the RDMA emulation software layer in the first virtual machine via the TCP socket, the prepended RDMA send frame (operation 710). The system performs the RDMA send operation over the TCP connection (operation 712). The operation continues at Label A of FIG. 7B.

Figure 7B:
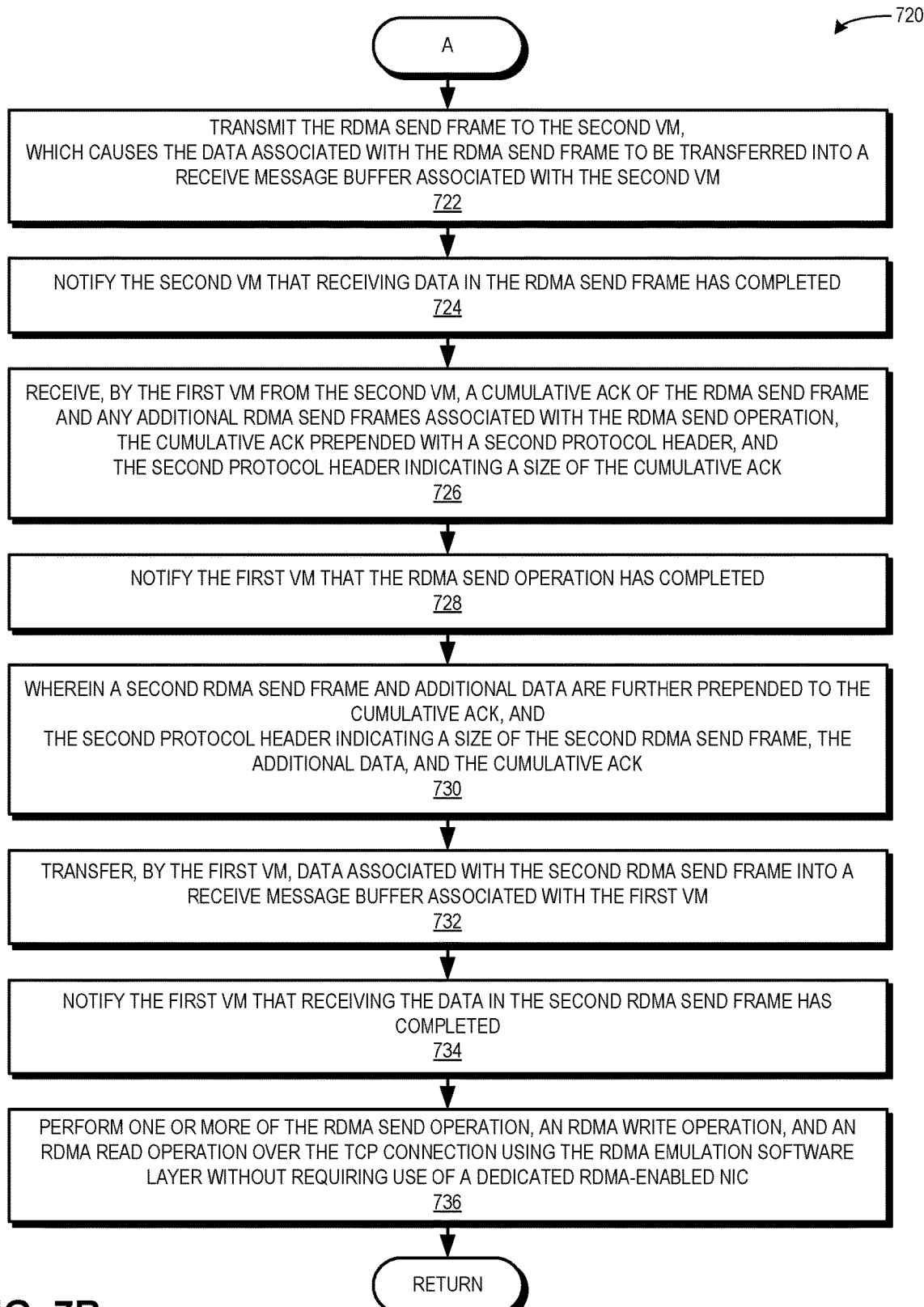
FIG. 7B presents a flowchart illustrating a method which facilitates software-based RDMA communications over TCP, in accordance with an aspect of the present application.

FIG. 7B presents a flowchart 720 illustrating a method which facilitates software-based RDMA communications over TCP, in accordance with an aspect of the present application. During operation, the system transmits the RDMA send frame to the second virtual machine, which causes data associated with the RDMA send frame to be transferred into a receive message buffer associated with the second virtual machine (operation 722). The system notifies the second virtual machine that receiving data in the RDMA send frame has completed (operation 724). The system receives, by the first virtual machine from the second virtual machine, a cumulative acknowledgment of the RDMA send frame and any additional RDMA send frames associated with the RDMA send operation, the cumulative acknowledgment prepended with a second protocol header associated with the RDMA emulation software layer, and the second protocol header indicating a size of the cumulative acknowledgment (operation 726). The system notifies the first virtual machine that the RDMA send operation has completed (operation 728). The cumulative acknowledgment is further prepended with a second RDMA send frame and additional data, and the second protocol header indicates a size of the second RDMA send frame, the additional data, and the cumulative acknowledgment (operation 730).

The system transfers, by the first virtual machine, data associated with the second RDMA send frame into a receive message buffer associated with the first virtual machine (operation 732). The system notifies the first virtual machine that receiving the data in the second RDMA send frame has completed (operation 734). Thus, as a result of the established TCP connection and the RDMA emulation software layer in both virtual machines, the system performs one or more of the RDMA send operation, an RDMA Write operation, and an RDMA Read operation over the TCP connection using the RDMA emulation software layer without requiring use of a dedicated RDMA-enabled NIC (operation 736). The operation returns.

Computer System for Facilitating Software-Based RDMA Communications Over TCP

Figure 8:
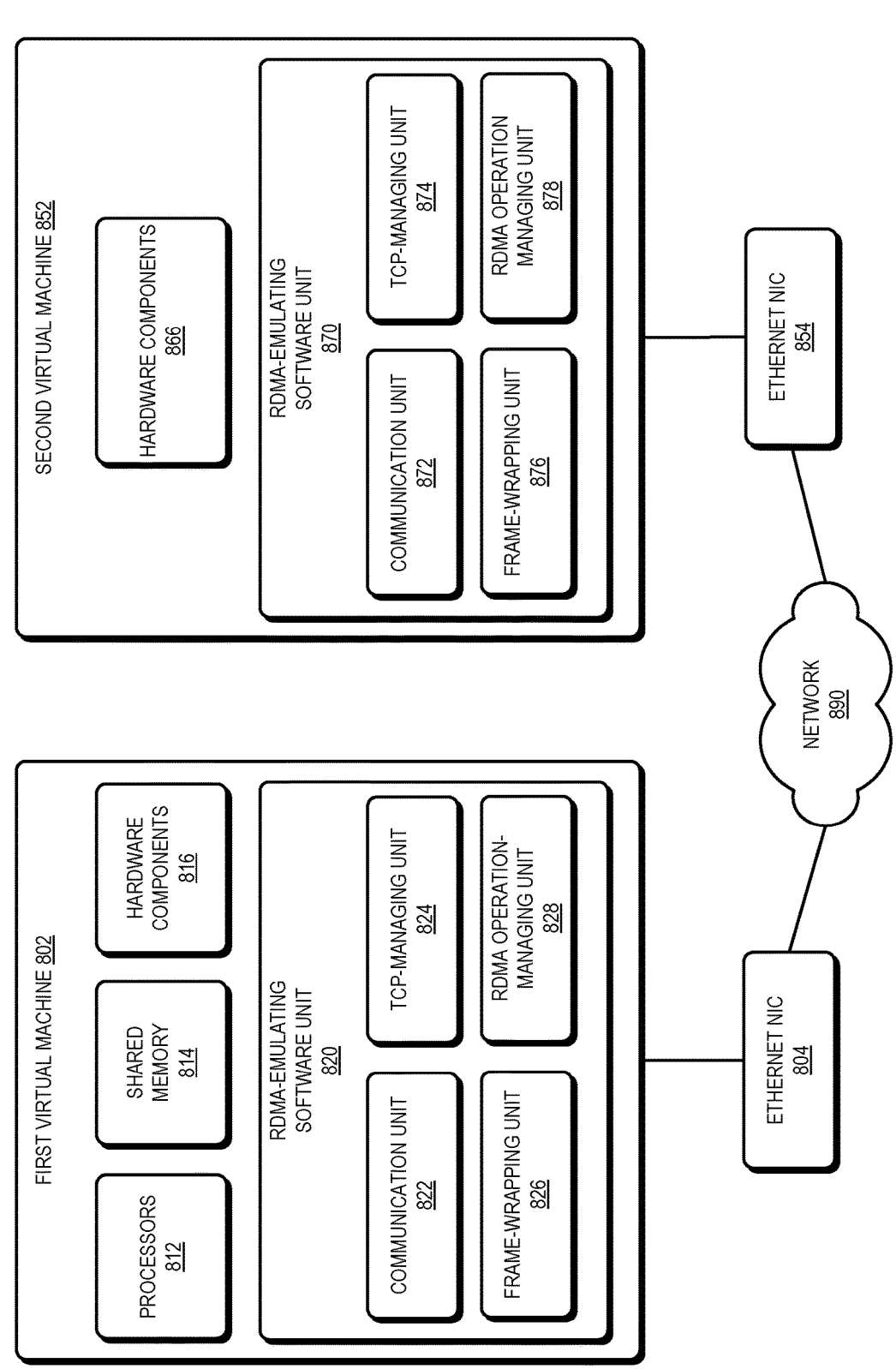
FIG. 8 illustrates a computer system which facilitates software-based RDMA communications over TCP, in accordance with an aspect of the present application.

FIG. 8 illustrates a computer system 800 which facilitates software-based RDMA communications over TCP, in accordance with an aspect of the present application. Computer system 800 can include a first virtual machine 802 and a second virtual machine 852. First virtual machine 802 can include: a pair of operating systems (not shown); processors or cores 812 dedicated to each OS; a shared memory 814 via which the pair of operating systems can communicate; hardware components 816 which can execute wire-level protocols; and an RDMA-emulating software unit 820, which can include units to perform the methods described herein. For example, RDMA-emulating software unit 820 can include: a communication unit 822 for transmitting/receiving requests, messages, data, frames, prepended frames, appended frames, or wrapped frames; a TCP-managing unit 824 for establishing, managing, or closing a TCP connection; a frame-wrapping unit 826 for prepending and appending information (such as a prepended protocol header and appended additional data) to a frame or an RDMA frame; and an RDMA operation-managing unit 828 for handling operation of at least an RDMA send, an RDMA Write, and an RDMA Read.

Second virtual machine 852 can include: hardware components 866 which can execute wire-level protocols; and an RDMA-emulating software unit 870, which can include units 872, 874, 876, and 878 for performing the methods described herein and in relation to units 822-828 of RDMA-emulating software unit 820.

First virtual machine 802 and second virtual machine 852 can communicate via, respectively, an Ethernet NIC 804 associated with first virtual machine 802 and an Ethernet NIC 854 associated with second virtual machine 854, over a network 890. Network 890 can be any fabric switching network over which communications via Ethernet NICs may occur.

While not depicted, each of first and second virtual machines 802 and 804 can include a volatile memory (e.g., RAM) that serves as a managed memory, and can be used to store one or more memory pools. Furthermore, each of first and second virtual machines 802 and 804 can be coupled to peripheral input/output (I/O) user devices (e.g., a display device, a keyboard, and a pointing device) (not shown). Each of first and second virtual machines 802 and 804 can also include a storage device which stores data (not shown).

Elements of computer system 800 can also represent a non-transitory computer-readable storage medium storing instructions that when executed by a computer cause the computer to perform the methods described herein (e.g., as performed by first and second virtual machines 802 and 804, including by RDMA-emulating software units 820 and 870). Computer system 800 may include fewer or more units than those shown in FIG. 8.

While the described embodiments depict the use of an RDMA emulation software layer which eliminates the requirement of RDMA-enabled hardware components (such as a RoCE NIC), in some aspects, a RoCE NIC may also be associated with each of first and second virtual machines 802 and 804. When included, the RoCE NIC can operate in parallel with the RDMA emulation software layer described herein.

Aspects and Variations of the Instant Application

In general, the disclosed aspects provide a method, computer system, and non-transitory computer-readable storage medium for facilitating software-based RDMA communications over TCP. In one aspect, the system establishes, by a remote direct memory access (RDMA) emulation software layer in a first virtual machine, a transport control protocol (TCP) connection with a second virtual machine. Responsive to establishing the TCP connection, the system identifies, by the RDMA emulation software layer in the first virtual machine based on socket information received from the second virtual machine, a TCP socket associated with the TCP connection. Responsive to the first virtual machine initiating an RDMA send operation, the system: prepends, by the RDMA emulation software layer in the first virtual machine, an RDMA send frame with a first protocol header associated with the RDMA emulation software layer; and transmits, by the RDMA emulation software layer in the first virtual machine via the TCP socket, the prepended RDMA send frame. The system performs the RDMA send operation over the TCP connection.

In a variation on this aspect, the RDMA emulation software layer comprises: a first software layer in the first virtual machine; and a second software layer in the second virtual machine.

In a further variation, the first protocol header indicates a size of the RDMA send frame. The system transmits the RDMA send frame to the second virtual machine, which causes data associated with the RDMA send frame to be transferred into a receive message buffer associated with the second virtual machine. The system receives, by the first virtual machine from the second virtual machine, a cumulative acknowledgment of the RDMA send frame and any additional RDMA send frames associated with the RDMA send operation. The cumulative acknowledgment is prepended with a second protocol header associated with the RDMA emulation software layer, and the second protocol header indicates a size of the cumulative acknowledgment. The system notifies the first virtual machine that the RDMA send operation has completed.

In a further variation, the cumulative acknowledgment is further prepended with a second RDMA send frame and additional data, and the second protocol header indicates a size of the second RDMA send frame, the additional data, and the cumulative acknowledgment. The system transfers, by the first virtual machine, data associated with the second RDMA send frame into a receive message buffer associated with the first virtual machine. The system notifies the first virtual machine that receiving the data in the second RDMA send frame has completed.

In a further variation, responsive to the first virtual machine initiating an RDMA Write operation, the system: prepends, by the first software layer, an RDMA Write frame with a second protocol header associated with the RDMA emulation software layer; and transmits, by the first software layer via the TCP socket, the prepended RDMA Write frame, which causes data associated with the RDMA Write frame to be transferred into an RDMA Write target buffer associated with the second virtual machine. The system receives, by the first virtual machine from the second virtual machine, a cumulative acknowledgment of the RDMA Write frame and any additional RDMA Write frames associated with the RDMA Write operation. The cumulative acknowledgment is prepended with a third protocol header associated with the RDMA emulation software layer, and the third protocol header indicates a size of the cumulative acknowledgment. The system notifies the first virtual machine that the RDMA Write operation has completed.

A further variation comprises one or more of: the RDMA Write frame appended with additional data, and the prepended second protocol header indicating a size of the RDMA Write frame and the additional data; and the cumulative acknowledgment further prepended with a second RDMA Write frame and additional data, the third protocol header indicating a size of the second RDMA Write frame, the additional data, and the cumulative acknowledgment. The system transfers, by the first virtual machine, data associated with the second RDMA Write frame into an RDMA Write target buffer associated with the first virtual machine. The system notifies the first virtual machine that the RDMA Write operation has completed.

In a further variation, responsive to the first virtual machine initiating an RDMA Read operation, the system: prepends, by the first software layer, an RDMA Read request with a second protocol header associated with the RDMA emulation software layer; and transmits, by the first software layer via the TCP socket, the prepended RDMA Read request; in response to the transmitting, the second virtual machine to obtain and return, in an RDMA Read reply frame, data requested in the RDMA Read request, the RDMA Read reply frame prepended with a third protocol header associated with the RDMA emulation software layer, and the third protocol header indicating a size of the RDMA Read reply frame. The system receives, by the first virtual machine, the prepended RDMA Read reply frame. The system transfers, by the first virtual machine, the obtained data in the RDMA Read reply frame into a local buffer associated with the first virtual machine. The system notifies the first virtual machine that the RDMA Read operation has completed.

In a further variation, the RDMA Read reply frame is appended with additional data, and the third protocol header indicates a size of the RDMA Read reply frame and the additional data.

In a further variation, the system establishes the TCP connection responsive to the first virtual machine transmitting a first message to establish a communication channel with the second virtual machine. The system transmits, by the first virtual machine, a request to close the communication channel with the second virtual machine. Responsive to the transmitted request to close the communication channel, the system transmits, by the first software layer to the second software layer, a first reset message which closes the TCP connection for the first virtual machine, the transmitted request causing the second virtual machine to issue a response to the request and further causing the second software layer to transmit to the first software layer a second reset message which closes the TCP connection for the second virtual machine. The system receives, by the first virtual machine, the response to the request. The system notifies the first and the second virtual machines that the communication channel is closed.

In a further variation, identifying the TCP socket for transmitting data associated with the TCP connection comprises: receiving, by the first software layer from the second software layer, an identifier for a queue pair corresponding to the TCP socket; associating, by the first software layer, the TCP socket with the identifier for the queue pair; transmitting, by the first software layer to the second software layer, an acknowledgment of the identifier; and subsequent to exchanging a reply acknowledging the first message and an acknowledgment of the reply, notifying the first and the second virtual machines of a successfully established communication channel.

In a further variation, the system performs one or more of the RDMA send operation, an RDMA Write operation, and an RDMA Read operation over the TCP connection without requiring use of a dedicated RDMA-enabled network interface card.

In another aspect, a computer system comprises a first virtual machine and a second virtual machine. The first virtual machine comprises: a first operating system associated with a first software layer which emulates a remote direct memory access (RDMA) protocol; and a second operating system which implements transport control protocol (TCP) and communicates via a first hypervisor with a first Ethernet NIC associated with the second operating system. The second virtual machine comprises: a second software layer which emulates the RDMA protocol, the second virtual machine implementing TCP and communicating via a second hypervisor with a second Ethernet NIC associated with the second virtual machine.

In a variation on this aspect, the first operating system and the second operating system communicate via a shared memory interface and inter-processor interrupts.

In a further variation, the first virtual machine and the second virtual machine communicate using the first Ethernet NIC and the second Ethernet NIC via one or more fabric switching networks.

In a further variation, a multi-cloud orchestration tool deploys and manages the first virtual machine and the second virtual machine.

In a further variation, the first virtual machine comprises a virtual machine in a massively parallel processing architecture (MPP) (e.g., a NonStop processor virtual machine), the first operating system comprises an operating system in the MPP architecture (e.g., a NonStop OS), the second virtual machine comprises a cluster input/output module virtual machine in the MPP architecture (e.g., a NonStop CLIM VM), and the first software layer and the second software layer comprise an RDMA emulation software layer. In a further variation, the first software layer and the second software layer are deployed in the first and the second virtual machines based on at least one of: a single root input/output virtualization; a peripheral component interconnect pass-through; and a fully virtualized system fabric interface.

In yet another aspect, a non-transitory computer-readable storage medium stores instructions that when executed by a computer cause the computer to perform the method described above, including in relation to FIGS. 2-6, 7A, and 7B.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:
    establishing, by a remote direct memory access (RDMA) emulation software layer in a first virtual machine, a transport control protocol (TCP) connection with a second virtual machine;
    responsive to establishing the TCP connection, identifying, by the RDMA emulation software layer in the first virtual machine based on socket information received from the second virtual machine, a TCP socket associated with the TCP connection;
    responsive to the first virtual machine initiating an RDMA send operation, performing the RDMA send operation over the TCP connection by:
        prepending, by the RDMA emulation software layer in the first virtual machine, an RDMA send frame with a first protocol header associated with the RDMA emulation software layer, the first protocol header indicating a size of the RDMA send frame;
        transmitting, by the RDMA emulation software layer in the first virtual machine via the TCP socket to the second virtual machine, the prepended RDMA send frame, which causes data associated with the RDMA send frame to be transferred into a receive message buffer associated with the second virtual machine;
    receiving, by the first virtual machine from the second virtual machine, a cumulative acknowledgment of the RDMA send frame and any additional RDMA send frames associated with the RDMA send operation,
    the cumulative acknowledgment prepended with a second protocol header associated with the RDMA emulation software layer, a second RDMA send frame, and additional data associated with optimization of subsequent communications,
    and the second protocol header indicating a size of the second RDMA send frame, the additional data, and the cumulative acknowledgment; and
    notifying the first virtual machine that the RDMA send operation has completed.

2. The method of claim 1, the RDMA emulation software layer comprising:
    a first software layer in the first virtual machine; and
    a second software layer in the second virtual machine.

3. The method of claim 2, further comprising:
    responsive to the first virtual machine initiating an RDMA Write operation:
        prepending, by the first software layer, an RDMA Write frame with a second protocol header associated with the RDMA emulation software layer; and
        transmitting, by the first software layer via the TCP socket, the prepended RDMA Write frame, which causes data associated with the RDMA Write frame to be transferred into an RDMA Write target buffer associated with the second virtual machine;
    receiving, by the first virtual machine from the second virtual machine, a cumulative acknowledgment of the RDMA Write frame and any additional RDMA Write frames associated with the RDMA Write operation,
    the cumulative acknowledgment prepended with a third protocol header associated with the RDMA emulation software layer, and the third protocol header indicating a size of the cumulative acknowledgment; and
    notifying the first virtual machine that the RDMA Write operation has completed.

4. The method of claim 3, further comprising one or more of:
    the RDMA Write frame appended with additional data, and the prepended second protocol header indicating a size of the RDMA Write frame and the additional data; and
    the cumulative acknowledgment further prepended with a second RDMA Write frame and additional data, the third protocol header indicating a size of the second RDMA Write frame, the additional data, and the cumulative acknowledgment, and
    wherein the method further comprises:
        transferring, by the first virtual machine, data associated with the second RDMA Write frame into an RDMA Write target buffer associated with the first virtual machine; and
        notifying the first virtual machine that the RDMA Write operation has completed.

5. The method of claim 2, further comprising:
    responsive to the first virtual machine initiating an RDMA Read operation:

prepending, by the first software layer, an RDMA Read request with a second protocol header associated with the RDMA emulation software layer;
transmitting, by the first software layer via the TCP socket, the prepended RDMA Read request;
in response to the transmitting, the second virtual machine to obtain and return, in an RDMA Read reply frame, data requested in the RDMA Read request, the RDMA Read reply frame prepended with a third protocol header associated with the RDMA emulation software layer, and the third protocol header indicating a size of the RDMA Read reply frame;
receiving, by the first virtual machine, the prepended RDMA Read reply frame;
transferring, by the first virtual machine, the obtained data in the RDMA Read reply frame into a local buffer associated with the first virtual machine; and
notifying the first virtual machine that the RDMA Read operation has completed.

6. The method of claim 5, further comprising:
the RDMA Read reply frame appended with additional data, and
the third protocol header indicating a size of the RDMA Read reply frame and the additional data.

7. The method of claim 2, further comprising:
establishing the TCP connection responsive to the first virtual machine transmitting a first message to establish a communication channel with the second virtual machine;
transmitting, by the first virtual machine, a request to close the communication channel with the second virtual machine;
responsive to the transmitted request to close the communication channel, transmitting, by the first software layer to the second software layer, a first reset message which closes the TCP connection for the first virtual machine,
the transmitted request causing the second virtual machine to issue a response to the request and further causing the second software layer to transmit to the first software layer a second reset message which closes the TCP connection for the second virtual machine;
receiving, by the first virtual machine, the response to the request; and
notifying the first and the second virtual machines that the communication channel is closed.

8. The method of claim 7, wherein identifying the TCP socket for transmitting data associated with the TCP connection comprises:
receiving, by the first software layer from the second software layer, an identifier for a queue pair corresponding to the TCP socket;
associating, by the first software layer, the TCP socket with the identifier for the queue pair;
transmitting, by the first software layer to the second software layer, an acknowledgment of the identifier; and
subsequent to exchanging a reply acknowledging the first message and an acknowledgment of the reply, notifying the first and the second virtual machines of a successfully established communication channel.

9. The method of claim 1, further comprising:
transferring, by the first virtual machine, data associated with the second RDMA send frame into a receive message buffer associated with the first virtual machine; and notifying the first virtual machine that receiving the data in the second RDMA send frame has completed.

10. The method of claim 1, further comprising:
performing one or more of the RDMA send operation, an RDMA Write operation, and an RDMA Read operation over the TCP connection without requiring use of a dedicated RDMA-enabled network interface card.

11. A non-transitory computer-readable storage medium storing instructions that when executed by a computer cause the computer to perform a method, the method comprising:
establishing, by a remote direct memory access (RDMA) emulation software layer in a first virtual machine, a transport control protocol (TCP) connection with a second virtual machine;
responsive to establishing the TCP connection, identifying, by the RDMA emulation software layer in the first virtual machine based on socket information received from the second virtual machine, a TCP socket associated with the connection; and
responsive to the first virtual machine initiating an RDMA Write operation:
prepending, by the RDMA emulation software layer in the first virtual machine, an RDMA Write frame with a protocol header associated with the RDMA emulation software layer; and
transmitting, by the RDMA emulation software layer in the first virtual machine via the TCP socket, the prepended RDMA Write frame, which causes the data associated with the RDMA Write frame to be transferred into an RDMA Write target buffer associated with the second virtual machine; and
receiving, by the first virtual machine from the second virtual machine, a cumulative acknowledgment of the RDMA Write frame and any additional RDMA Write frames associated with the RDMA Write operation,
the cumulative acknowledgment prepended with a second protocol header associated with the RDMA emulation software layer, a second RDMA write frame, and additional data associated with optimization of subsequent communications, and
the second protocol header indicating a size of the second RDMA write frame, the additional data, and the cumulative acknowledgment;
transferring, by the first virtual machine, data associated with the second RDMA Write frame into an RDMA Write target buffer associated with the first virtual machine; and
notifying the first virtual machine that the RDMA Write operation has completed.

12. The non-transitory computer-readable storage medium of claim 11,
the RDMA Write frame further appended with first additional data, and the prepended protocol header indicating a size of the RDMA Write frame and the first additional data.

13. The non-transitory computer-readable storage medium of claim 11,
the RDMA emulation software layer comprising a first software layer in the first virtual machine and the RDMA emulation software layer further comprising a second software layer in the second virtual machine,
wherein identifying the TCP socket associated with the TCP connection comprises:
receiving, by the RDMA emulation software layer in the first virtual machine from RDMA the second software layer, an identifier for a queue pair corresponding to the TCP socket; and associating, by the first software layer, the TCP socket with the identifier for the queue pair;
transmitting, by the first software layer to the second software layer, an acknowledgment of the identifier; and
subsequent to exchanging a reply acknowledging the first message and an acknowledgment of the reply, notifying the first and the second virtual machines of a successfully established communication channel.

* * * * *